Patented Aug. 9, 1927.

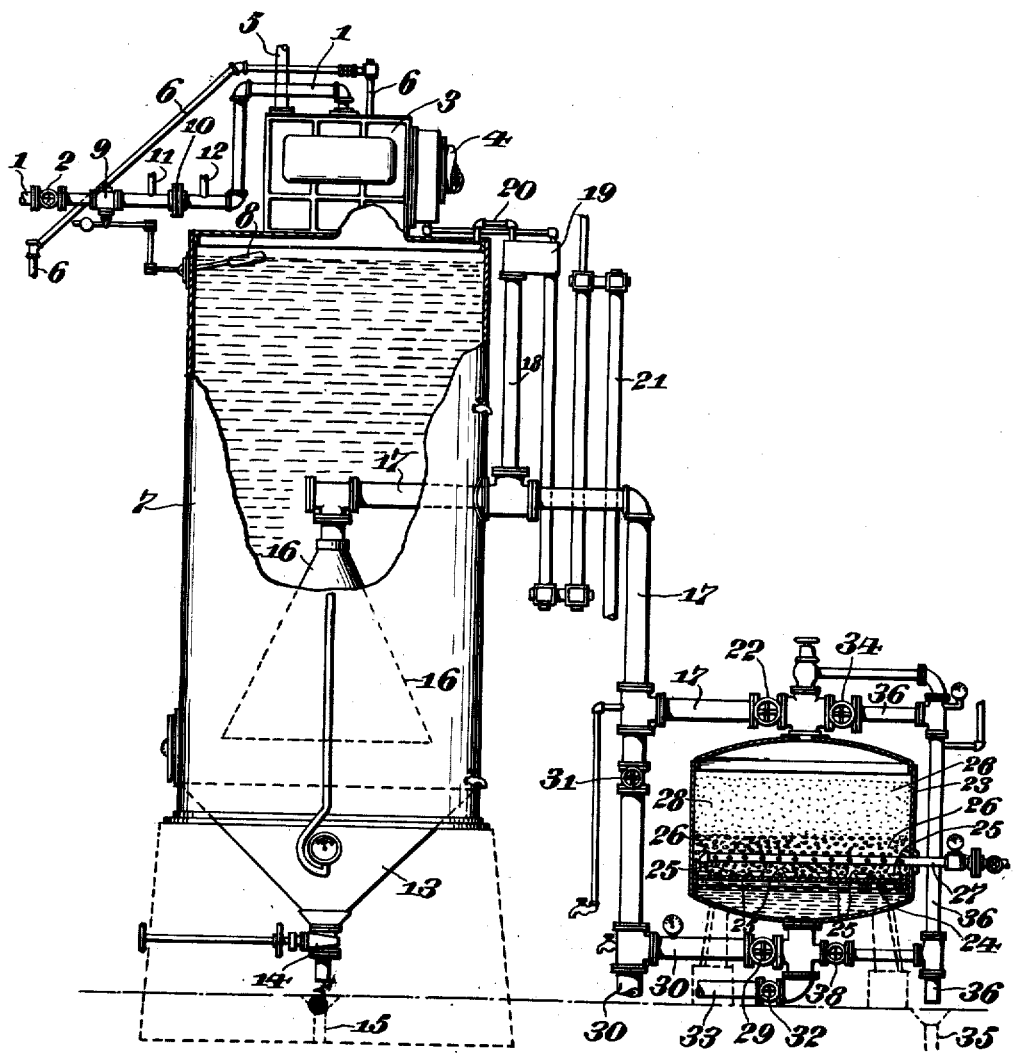

1,638,803

UNITED STATES PATENT OFFICE.

GEORGE H. GIBSON, OF MONTCLAIR, NEW JERSEY, AND JOSEPH D. YODER, OF PHILADELPHIA, PENNSYLVANIA, ASSIGNORS TO COCHRANE CORPORATION, OF PHILADELPHIA, PENNSYLVANIA, A CORPORATION OF PENNSYLVANIA.

WATER TREATMENT.

Application filed February 23, 1924. Serial No. 694,468.

Our invention relates to treatment of water utilizable for various purposes, but particularly for industrial purposes, and more particularly for feed water for steam generators or boilers.

In accordance with our invention, raw water, or water which has been previously treated to greater or less extent, is subjected, usually while at elevated temperature, to suitable reagent or reagents, as softening reagent or reagents, and then filtered through a medium of mineral matter having such chemical characteristics that it does not to appreciable or substantial extent go into solution in the treated water while still at elevated temperature and containing treating reagent or product in solution, and consisting wholly or partially of calcium carbonate, and more particularly the natural minerals calcite, marble, and the like.

More particularly in accordance with our invention, the water is subjected while at elevated temperature to a softening reagent or reagents, as sodium carbonate and calcium hydroxide, or equivalents, and the treated water while still at elevated temperature, and while alkaline, is filtered through a filter medium of non-siliceous material, as granulated calcium carbonate, calcite, marble and the like, which will not to appreciable or substantial extent dissolve in the alkaline water containing, for example, compounds of iron, calcium or magnesium, with the result that the filter medium does not impart to the water a boiler-scale-forming material.

This application is a continuation in part of our prior application Serial Number 535,447 filed February 10, 1922.

Our invention resides in a method of treating water of the character hereinafter described and claimed.

For an illustration of one of many forms of apparatus utilizable in carrying out our invention, reference is to be had to the accompanying drawing, which is an elevational view, parts in section, of hot process softening and filtering apparatus.

Heretofore, in preparing boiler feed water, it has been a common practice, in order to reduce or remove compounds of calcium, magnesium, iron and aluminum, which would otherwise form scale or incrusting solids in the boiler, to subject the raw water while at suitably elevated temperature to suitable softening reagents, as soda ash (sodium carbonate) or lime (calcium hydroxide), or both, in sufficient quantity, preferably in excess, to react with compounds of iron, calcium, magnesium, etc., contained in the water, with resultant precipitation of solids or semi-solids produced by the chemical reactions, the water after such treatment being left alkaline, due to monocarbonate, or hydroxide, or both. The warm or hot alkaline water is then passed through a filtering medium consisting of sand and gravel, that is, silica or siliceous material.

It has been found by us that water so treated and filtered through siliceous material, as quartz sand and gravel, caused deposition, in the boiler to which it was fed for the production of steam, of solids, partly in the form of mud and partly as a hard scale adhering to the walls of the boiler structure; these scale-forming solids were found to be silica or siliceous material, for example, calcium silicate. On the other hand, upon passing the softened hot alkaline water directly to the boiler, without passage through the filter medium of siliceous material, the aforesaid scale or hard scale was not formed in appreciable amounts. It was accordingly found that the scale-forming material deposited in the boiler when filtering the softened hot alkaline water through siliceous material was due to the fact that there was dissolved in the hot alkaline water during passage through the filter more or less silica from the filter medium itself. Analysis of the softened hot alkaline water shows that the silica content of the water is increased by passing the treated hot alkaline water through the siliceous filter medium. The fact, as found, that appreciable amounts of silica go into solution in the hot alkaline water in passing through a sand filter renders such a siliceous filter medium to material extent unsuitable for filtering water softened by the aforesaid hot process.

In accordance with our invention, we avoid the use of siliceous material for the filter medium and employ another suitable non-siliceous material which is not to material or substantial extent soluble in the hot alkaline water filtered therethrough, and so avoid deposition of solids, as scale or otherwise, in the boiler, due to the filter medium itself; and such silica as may have been originally in the water is insufficient in quantity to effect deposition of substantial amounts of solid or scale in the boiler.

Inasmuch as the compounds predominating in the raw water are those of calcium, magnesium and iron, we employ as a filter medium a compound of iron, magnesium or calcium, preferably calcium carbonate, alone or in mixture with other suitable non-siliceous material; the filter medium is preferably employed in the form of natural mineral, or minerals, having a density or specific gravity of about two and upwards.

Such a filter medium, because the hot softened alkaline water is already largely charged or saturated with compounds of iron, calcium and magnesium, and generally is incapable, at the temperature and alkalinity involved, of taking into solution more compounds of iron, calcium or magnesium, produces substantially no effect upon the hot alkaline water, with the result that there is no deposition in the boiler of solids caused by material dissolved from the filter medium; and when the filter medium has a specific gravity upwards of about twice that of water, its finer granules have sufficient weight to prevent their removal from the filter bed while the latter is undergoing washing, as reverse or back washing.

A further desirable characteristic of the filter material is its physical nature or structure, which may be in a general sense termed crystalline, which will allow it to be granulated to suitable sizes without formation of undue amount of powder or particles which are too small, and are therefore waste material, and which, even if employed in the filter bed, would more or less readily be carried off by the filter wash water. It is also a desirable characteristic that the material be of such nature that the granules, once formed of suitable or proper size, shall not easily crumble or disintegrate or otherwise lose their physical structure.

As the filter medium we employ a compound of calcium and preferably calcium carbonate including limestone, marble, chalk, calcite, aragonite, dolomite, ankerite and the like. Our preferred material is crystalline calcium carbonate, as calcite, including marble and the like.

Compounds of calcium other than the carbonates may be utilized, such as the minerals apatite, fluorite, scheelite, perovskite, gypsum, anhydrite and others, but these compounds of calcium will generally not be found as suitable as calcium carbonate because of their greater solubility in the hot alkaline treated or softened water.

Compounds of minerals other than those of calcium may be employed, as for example, the mineral magnetite, i. e., magnetic iron ore, which is a mixture of iron oxides; hematite; limonite; siderite (iron carbonate); iron pyrites; various barytes, and the like.

A filter medium of calcium carbonate is, from the chemical standpoint, essentially the same as the calcium carbonate precipitated in the water by application of a softening reagent, with the result that the filter medium of calcium carbonate is least soluble in the hot alkaline water, and therefore more desirable.

Calcite is better adapted for our purposes than aragonite, dolomite and ankerite, because the crystalline structure of calcite is such as readily to permit crushing and screening to suitable or required sizes with less waste than other species of calcium carbonate.

A highly efficient form of calcite is of the type found in the Cockeysville marble deposits occurring at or near Cockeysville, Maryland, California and other places. Calcite of this type is characterized as large-crystal loosely aggregated stone.

Some forms of calcium carbonate, calcite or marble when granulated produce great amounts of small particles of waste, and therefore we prefer to use those of the aforesaid calcium compounds, particularly carbonates, as calcites, marbles and the like, which will suitably granulate without great waste, and whose granules will maintain their physical structure.

The foregoing materials are non-siliceous, and therefore there cannot be dissolved from them in the hot alkaline water any mud or scale-forming silica; and since the hot softened alkaline water is already saturated or substantially saturated, as regards its temperature and alkalinity, with compounds of iron, calcium and magnesium, no further compounds of those characters will be dissolved from the filter bed during filtration of the softened hot alkaline water, and no further solids or scale will be formed in the boiler than is possible with the compounds of iron, calcium and magnesium in solution in the boiler feed water, and these compounds have by the softening process been eliminated from the water, except in so far as they are soluble in the water with its prevailing temperature and alkalinity.

By way of example, and preferably, but without limitation of our invention thereto, the filter material is formed into granules which will pass a ten mesh screen and be retained on a twenty-four mesh screen. Such granular material is formed upon an underlying bed of like material of coarser formation, particularly when strainer valves are employed in the filter. The coarser material is, by way of example, and preferably, but without limitation of our invention thereto, of such size as to pass through a three-eighths inch mesh screen and be retained on a one-quarter inch mesh screen. It will be understood, however, that both the fine and coarse material may partake of different sizes or grades, depending upon the nature of the suspended matter to be filtered from the water.

The drawing illustrates one form of apparatus utilizable in connection with our invention; it will be understood however, that any suitable apparatus may be employed, and that our invention is not limited in this respect.

In the drawing, 1 is the pipe, controlled by the valve 2, through which is delivered the raw water, or water previously treated to greater or less extent in any suitable manner, to the heater 3 which, in the example illustrated, is of the open type in which the water delivered through the pipe 1 comes into direct contact with the heating medium, as exhaust steam delivered into the heater through the conduit 4. When the heating and softening is to be effected at substantially atmospheric pressure, the heater 3 may be vented to atmosphere by the vent pipe 5. The reagent or reagents, as soda ash or lime, or both, as aforesaid, and preferably in excess, is or are delivered through the chemical feed pipe 6 into the interior of the heater 3 into the water delivered thereto through the pipe 1, the water and the contained reagent passing over the trays of the heater while in contact with the exhaust steam and falling into the treating tank 7, within which is disposed the float 8, which controls through a suitable system of levers the valve 9, which admits water through the pipe 1 to the heater 3 in such quantity as to maintain the tank 7 full or substantially so.

If desired, and preferably, the reagent is proportioned to the amount of water delivered to the heater 3. This may be accomplished in any suitable way, as for example, by a chemical or reagent proportioner such as disclosed in Letters Patent of the United States No. 1,262,730, controlled by the difference between the pressures on opposite sides of the orifice plate 10 disposed in the pipe 1, the two pressures being communicated to the apparatus through the pipes 11 and 12, and reagent in proper proportion being delivered through the aforesaid pipe 6.

The water is elevated in temperature in the heater 3 so that it becomes "hot", that is, is elevated to a temperature upwards of 130 or 150 degrees F. and preferably to a temperature of 200 to 210 degrees F. when under atmospheric pressure, and to correspondingly higher temperature if under pressure above atmospheric pressure. The added chemical solution reacts with contents of the water, producing a precipitate which settles in the tank 7 and collects in its bottom 13, from which the sludge or sediment may be drawn off from time to time through the valve 14 to waste or sewer connection 15.

The clarified and softened water passes upwardly through the uptake chamber 16 and is discharged through the pipe 17 connected by pipe 18 with the overflow chamber 19, between which and the upper end of the tank 7 may be connected the pressure-equalizing pipe 20. With the overflow chamber may be connected the usual piping 21, forming a water seal trap. The pipe 17 delivers the hot softened water through the valve 22 into the top of the filter chamber 23, in whose lower portion is the diaphragm or sheet 24 having openings controlled by the strainer valves 25. Upon the diaphragm 24 is disposed a mass or layer 26 of the coarse calcite or other filtered material hereinbefore referred to, or a mixture of two or more of them, the coarse bed 26 extending above the pipe 27 having numerous perforations through which may be forced air under pressure for agitating the filter medium. Upon the bed 26 is disposed the bed 28 of the finer granules of calcite or other material, or a mixture of two or more of them. The hot softened water passes downwardly through the beds 28 and 26 in succession, and through the strainer valves and diaphragm 24 into the bottom of the filter chamber 23 and outwardly through the valve 29 and pipe 30, which delivers the filtered water to the boiler feed pump or other desired destination.

When it is desired to wash the filter, the valves 22 and 29 are closed and the valve 31 opened, whereby during the washing period the unfiltered water is delivered through the pipe 17 to the boiler feed line 30. While the valves 22 and 29 are closed, the valve 32 is opened and water under pressure is delivered therethrough from the pipe 33 into the bottom of the filter chamber 23 and upwardly through the diaphragm 24 and valves 25 and upwardly through the filter beds 26 and 28, for reverse or back washing them, the water being applied in sufficient quantity and velocity to agitate the filter material and remove therefrom the solids filtered from the water theretofore delivered through the pipe 17. As the filter medium has a specific gravity of 2 and upwards, the backwashing does not deplete the filter bed as it does when a charcoal filter, for example, is employed. The wash water passes out through the upper end of the chamber 23 through the now open valve 34, and thence to waste or sewer connection 35 through the pipe 36. After the filter has been washed, the valves 31, 32 and 34 are closed and valves 22 and 29 opened, whereupon the hot softened alkaline water again passes through the filter in normal direction and is delivered to the boiler feed line 30.

From the outlet at the lower end of the filter chamber 23 there is a pipe connection 37 with the waste pipe 36, through which the filter may be connected to waste, upon suitable occasion, by opening the valve 38.

While we have in the foregoing description referred to soda ash and lime as softening reagents, since they are generally preferred and most commonly used, it will be understood that any suitable equivalents of these reagents may be employed, as for example, tri-sodium phosphate, sodium hydroxide, barium hydroxide, barium carbonate, etc.

What we claim is:

1. The method of treating water, which comprises subjecting the water to a reagent of such character and in such quantity as to produce a precipitate and to leave the water alkaline, and filtering the alkaline water through a medium comprising a compound of calcium substantially insoluble in the alkaline water.

2. The method of treating water, which comprises subjecting the water to a reagent of such character and in such quantity as to produce a precipitate and to leave the water alkaline, and filtering the alkaline water through mineral matter comprising calcium carbonate substantially insoluble in the alkaline water.

3. The method of treating water, which comprises subjecting the water to a reagent in such quantity and of such character as to produce a precipitate of calcium carbonate and to leave the water alkaline, and filtering the alkaline water through mineral matter comprising a compound of calcium substantially insoluble in the alkaline water.

4. The method of treating water, which comprises subjecting the water to a reagent in such quantity and of such character as to produce a precipitate of calcium carbonate and to leave the water alkaline, and filtering the alkaline water through mineral matter comprising calcium carbonate.

5. The method of treating water, which comprises subjecting the water to a reagent producing a precipitate and leaving the water alkaline, and filtering the alkaline water through a bed of granules of calcite.

6. The method of treating water, which comprises subjecting the water to a reagent producing a precipitate and leaving the water alkaline, and filtering the alkaline water through a bed of granules of calcite of the Cockeysville type.

7. The method of preparing boiler feed water, which comprises softening raw water while hot by application of suitable reagent, and thereafter filtering the softened alkaline water while hot through mineral matter comprising a compound of calcium insoluble in the hot softened water.

8. The method of preparing boiler feed water, which comprises softening raw water while hot by application of reagent producing precipitate and leaving the water alkaline, and thereafter filtering the hot alkaline water through mineral matter comprising calcite.

9. The method of filtering hot alkaline water, which comprises passing the same through a filter medium comprising granules of calcium carbonate.

10. The method of treating boiler feed water, which comprises softening the water while hot by a reagent of such character and in such quantity as to produce a precipitate and to leave the water alkaline, and filtering the hot alkaline water through a medium comprising a compound of calcium of such character that there is not dissolved therefrom in appreciable quantity material inducing deposition of scale.

11. The method of treating boiler feed water, which comprises softening the water while hot by a reagent of such character and in such quantity as to produce a precipitate and to leave the water alkaline, and filtering the hot alkaline water through a filter medium comprising a calcium compound of such character that there is not dissolved from the medium in appreciable quantity siliceous scale forming material.

12. The method of operating upon boiler water to prevent deposition of scale, which comprises filtering the water while hot through a medium comprising a granular compound of calcium of such character that there is not dissolved therefrom in appreciable quantity material inducing deposition of scale.

13. The method of operating upon boiler water to prevent deposition of scale, which comprises filtering the water while hot through a medium comprising granular crystalline calcium carbonate.

14. The method of treating water, which comprises subjecting the water while hot to a reagent of such character and such quantity as to produce a precipitate and to leave the water alkaline, and filtering the hot alkaline water through mineral matter of such character that there is not dissolved therefrom in appreciable quantity material inducing deposition of solids or scale.

15. The method of treating water containing compounds of iron, calcium or magnesium, which comprises subjecting the same while hot to a reagent to produce a precipitate and leave the water alkaline, and filtering the hot alkaline water through mineral matter substantially free of siliceous material and substantially free of material soluble in the treated water and inducing deposition of solids or scale.

16. The method of filtering hot alkaline boiler water, which comprises passing it through a filter medium of mineral matter substantially free of siliceous material and material soluble in the water and capable of causing deposition in the boiler of solids or scale.

17. The method of treating water containing one or more compounds of the metal or metals iron, calcium and magnesium, which comprises subjecting the water while hot to a reagent producing a precipitate comprising a compound or compounds of one or more of said metals and leaving the water alkaline, and filtering the hot alkaline water through a filter medium comprising a compound of one of such metals, substantially free of siliceous material soluble in the alkaline water.

18. The method of treating water, which comprises subjecting the water while hot to a reagent of such character and in such quantity as to produce a precipitate and leave the water alkaline, and filtering the alkaline water through mineral matter of such character that there is not dissolved therefrom in appreciable quantity material inducing deposition of siliceous scale.

GEORGE H. GIBSON.
JOSEPH D. YODER.

substantially free of siliceous material and material soluble in the water and capable of causing deposition in the boiler of solids or scale.

17. The method of treating water containing one or more compounds of the metal or metals iron, calcium and magnesium, which comprises subjecting the water while hot to a reagent producing a precipitate comprising a compound or compounds of one or more of said metals and leaving the water alkaline, and filtering the hot alkaline water through a filter medium comprising a compound of one of such metals, substantially free of siliceous material soluble in the alkaline water.

18. The method of treating water, which comprises subjecting the water while hot to a reagent of such character and in such quantity as to produce a precipitate and leave the water alkaline, and filtering the alkaline water through mineral matter of such character that there is not dissolved therefrom in appreciable quantity material inducing deposition of siliceous scale.

GEORGE H. GIBSON.
JOSEPH D. YODER.

Certificate of Correction.

Patent No. 1,638,803.  Granted August 9, 1927, to

GEORGE H. GIBSON ET AL.

It is hereby certified that error appears in the printed specification of the above-numbered patent requiring correction as follows: Page 2, line 14, after the word "mineral" strike out the comma; page 3, line 85, for the word "filtered" read *filter;* and that the said Letters Patent should be read with these corrections therein that the same may conform to the record of the case in the Patent Office.

Signed and sealed this 22d day of November, A. D. 1927.

[SEAL.]
M. J. MOORE,
*Acting Commissioner of Patents.*

Certificate of Correction.

Patent No. 1,638,803.                                  Granted August 9, 1927, to

GEORGE H. GIBSON ET AL.

It is hereby certified that error appears in the printed specification of the above-numbered patent requiring correction as follows: Page 2, line 14, after the word "mineral" strike out the comma; page 3, line 85, for the word "filtered" read *filter;* and that the said Letters Patent should be read with these corrections therein that the same may conform to the record of the case in the Patent Office.

Signed and sealed this 22d day of November, A. D. 1927.

[SEAL.]                                                        M. J. MOORE,
*Acting Commissioner of Patents.*